March 2, 1971  E. O. HOWELL ET AL  3,566,589
HARVESTING MACHINE
Filed Sept. 27, 1968  5 Sheets-Sheet 2
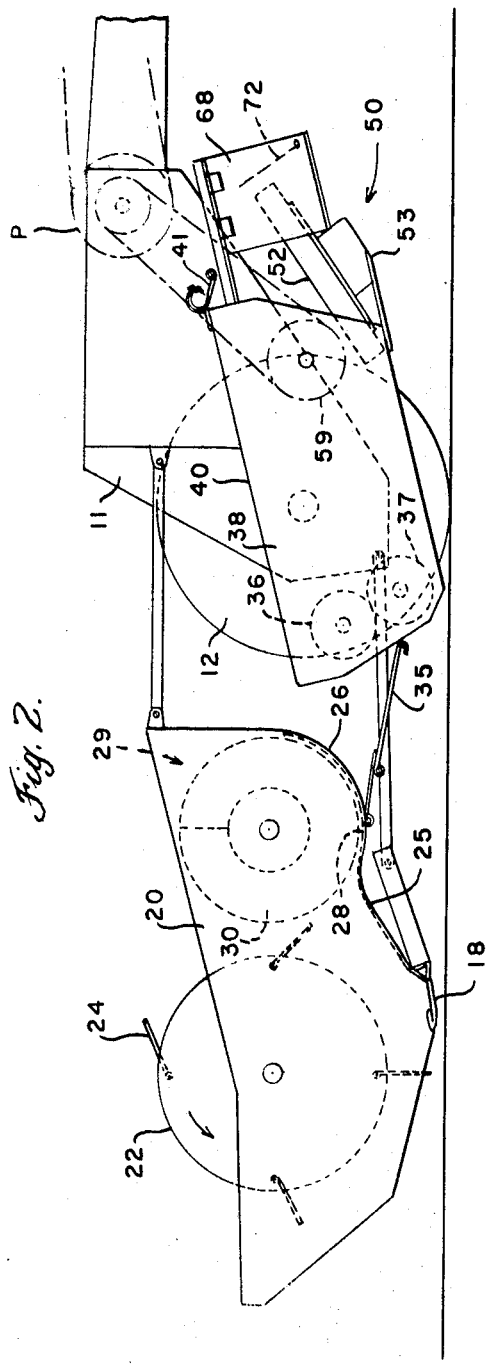
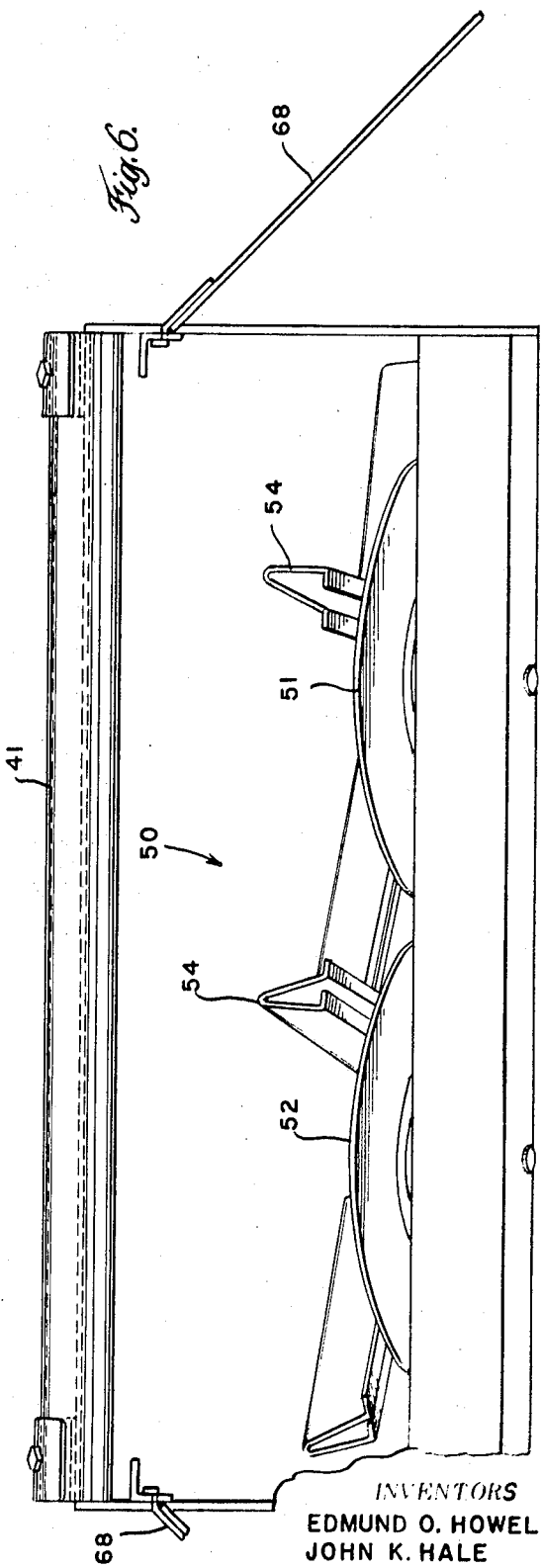
INVENTORS
EDMUND O. HOWELL
JOHN K. HALE
& HORACE G. MC CARTY
BY
ATTORNEY

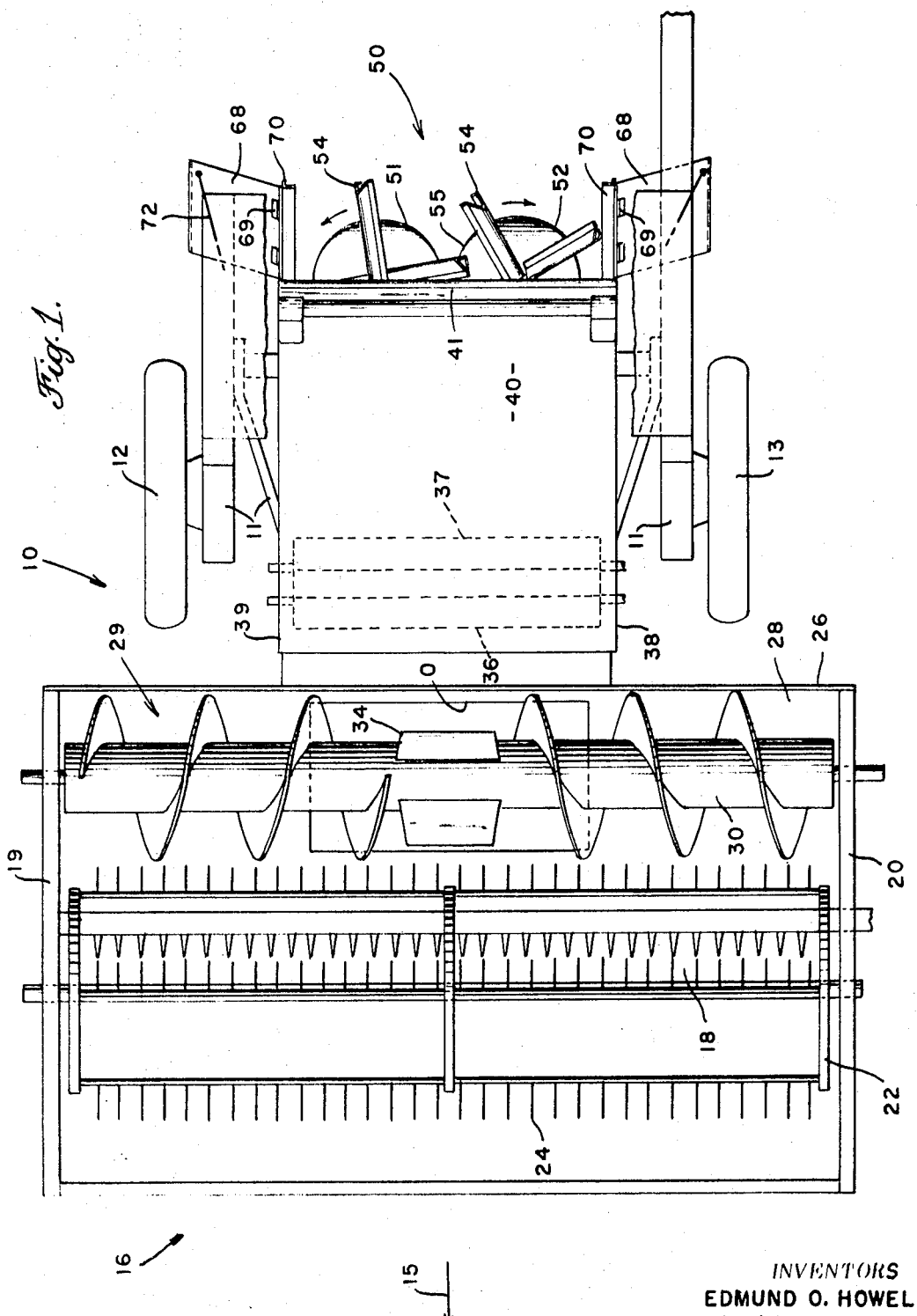

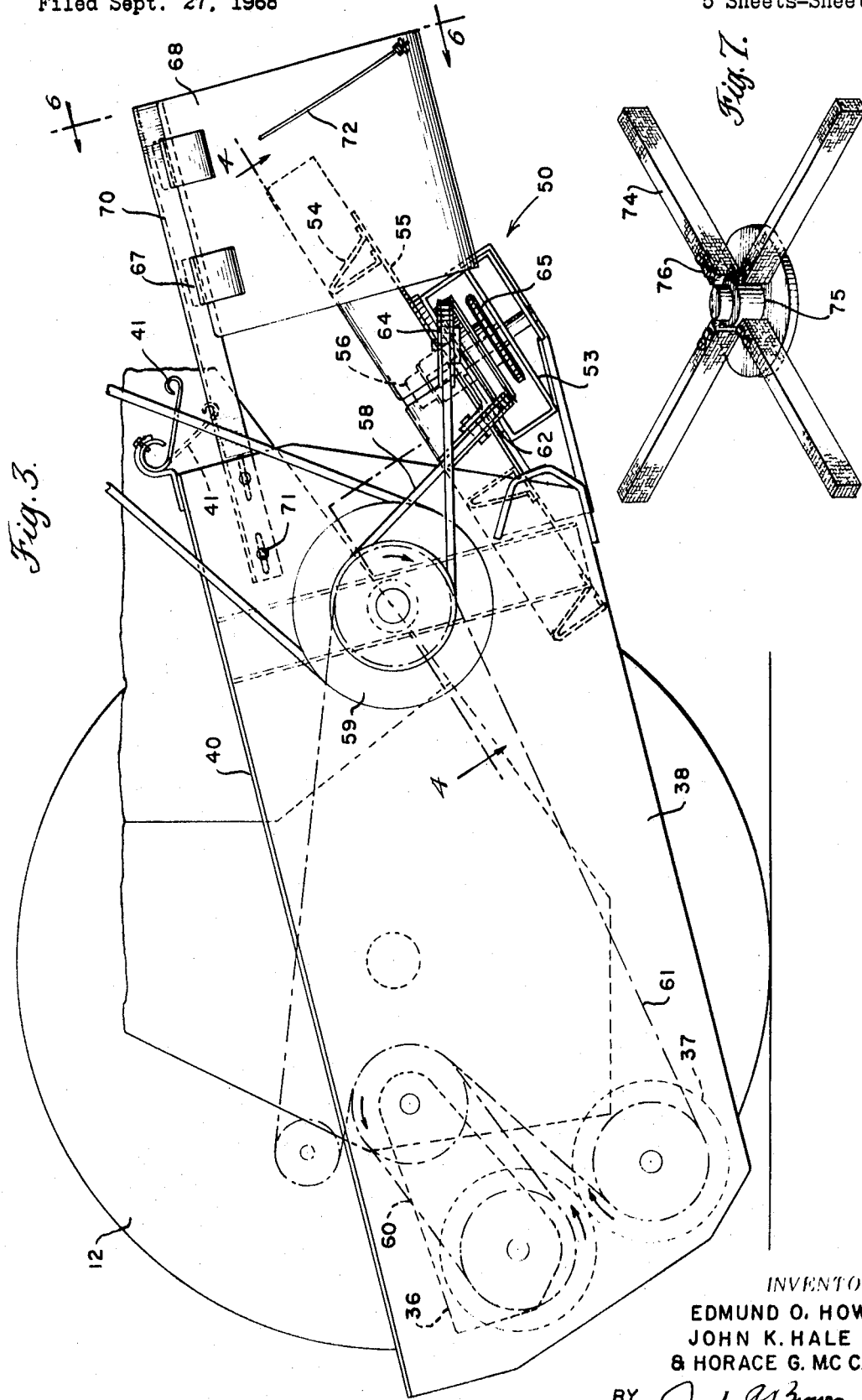

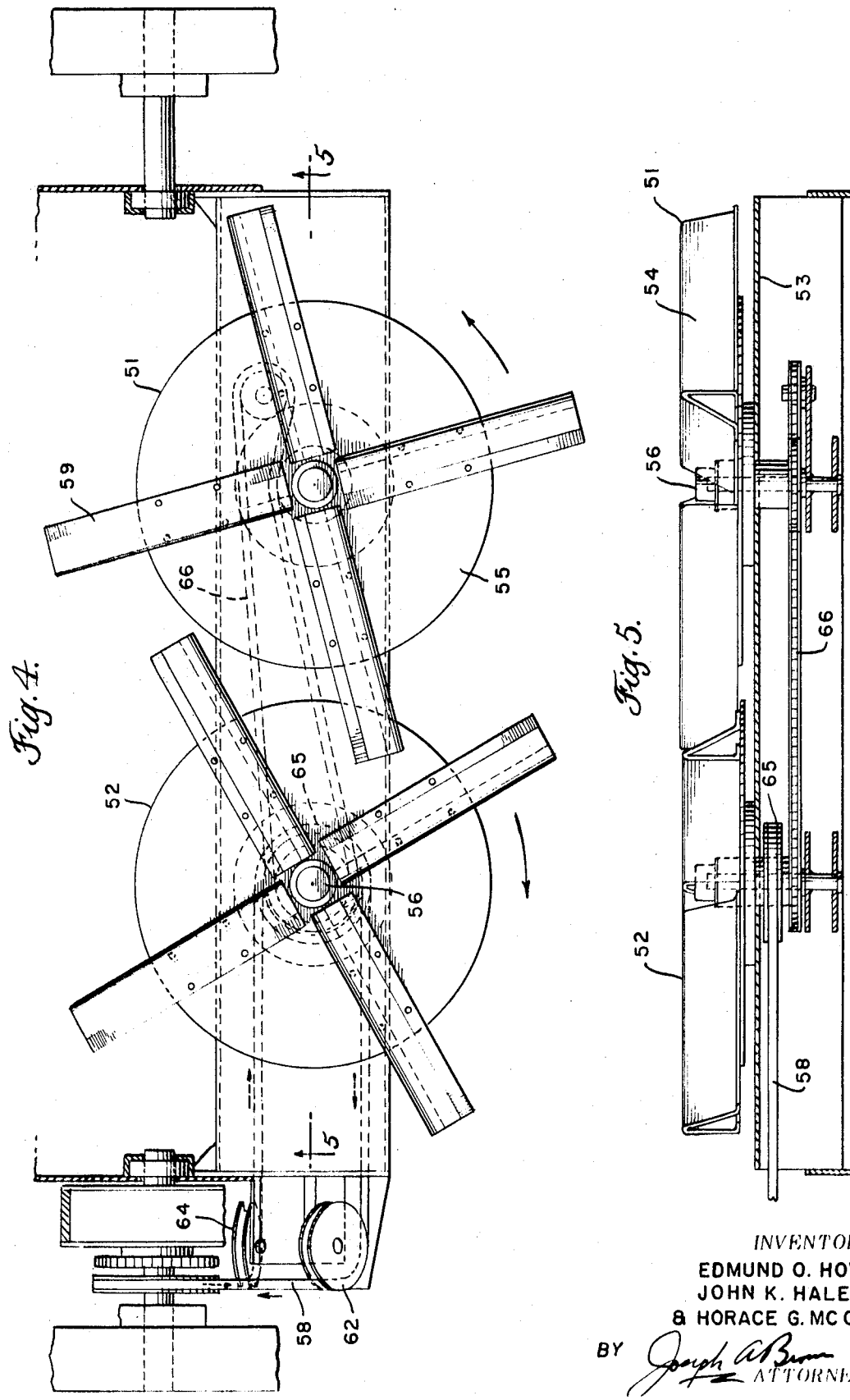

INVENTORS
EDMUND O. HOWELL
JOHN K. HALE
& HORACE G. MCCARTY

BY *Joseph A Brown*
ATTORNEY

`United States Patent Office`

3,566,589
Patented Mar. 2, 1971

3,566,589
HARVESTING MACHINE
Edmund O. Howell and John K. Hale, New Holland, and Horace G. McCarty, Leola, Pa., assignors to Sperry Rand Corporation, New Holland, Pa.
Filed Sept. 27, 1968, Ser. No. 763,149
Int. Cl. A01d *43/00*
U.S. Cl. 56—23   18 Claims

ABSTRACT OF THE DISCLOSURE

A harvesting machine in which a given width of crop material is cut and laterally consolidated into a narrow mass and then deposited in a rearwardly located mechanism which scatters the material laterally for deposit on the ground in a swath wider than the narrow mass.

BACKGROUND OF INVENTION

A conventional swather or windrower has a header which cuts a width of standing crop material which may be fourteen, sixteen, or more feet wide. Usually a swather has a reel which sweeps the crop material over the sickle and then deposits the cut material on a receiving table. Either transverse apron means or an auger is employed to laterally consolidate the material and then discharge the material from the header onto the ground in a windrow.

In many swathers, the hay is delivered from the header to a pair of conditioning rolls, which may be either crushing or crimping rolls. The consolidated hay is passed between the rolls and in this process it is conditioned before being deposited on the ground to thereby facilitate and speedup the drying of the windrowed hay.

One limitation of a swather is the fact that it deposits the hay in a windrow and some farmers do not like this because the drying time takes longer than if the crop material was deposited in a swath as wide as the cut made by the header. Where the machine windrows the material, no problems result if the climate is arid and hot. However, in the humid areas, such as in the north-eastern and upper midwestern United States, the drying time may be too long to suit the farmers if the material is windrowed directly after it is cut.

One machine placed on the market in 1964 eliminates this problem by providing means whereby the crop material may be deposited on the ground in a swath substantially as wide as the cut made by the machine. Such a machine is shown in Pat. No. 3,375,643 in which the rolls which condition the crop material have a length substantially as great as the sickle and the harvesting reel. The machine provides an outstanding conditioning action because the rolls operate on a then, non-consolidated mass of material. However, such machine is limited as to how great a width of material can be cut and conditioned in this fashion because there are limits as to how far the ground wheels can be spread apart. By contrast, a windrower can have a header of any desired size and it can cut twenty, twenty-four or more feet and still operate satisfactorily because the ground wheels of the machine can be close together behind the header and the hay may be discharged between the wheels by being laterally consolidated before it is discharged.

SUMMARY OF THE INVENTION

The present invention provides a machine which will have the advantages of a swather and also some of the advantages of a mower-conditioner which is able to maintain the material as wide as the cut. In this machine, a wide cut is made through standing crop material. The cut material is then laterally consolidated into a narrow mass and discharged. The discharged material is delivered between the wheels of the device and rearwardly to a scattering mechanism which engages the cut material and deposits it on the ground in a width much greater than the consolidated mass and if desired in a swath as wide as the original cut. Preferably, a conditioning device is interposed between the header of the machine and the scattering device so that as the consolidated material is delivered rearwardly, it is conditioned so that drying will be facilitated when the material is ultimately deposited in a swath on the ground.

A main object of this invention is to provide a machine which will cut a very wide swath of material, consolidate it, deliver the material rearwardly and then scatter the material for deposit in a swath as wide as the original cut made by the machine.

Another object of this invention is to provide a machine of the character described in which the width of the swath of the deposited crop material can be varied as desired by the operator of the machine.

BRIEF DESCRIPTION OF THE DRAWINGS

FIG. 1 is a generally diagrammatic plan view showing a machine constructed according to this invention and showing the header, sickle, the reel over the sickle, the consolidating auger behind the reel, the conditioning device behind the auger and scatterer for spreading the material in a wide swath behind the machine.

FIG. 2 is a generally diagrammatic side elevation of FIG. 1;

FIG. 3 is an enlarged side elevational view of the conditioner portion of the machine and the scatterer behind it constructed according to one embodiment of this invention;

FIG. 4 is a plan view of the scatterer taken generally on the line 4—4 of FIG. 3 looking in the direction of the arrow;

FIG. 5 is a front view of the scatterer taken generally on the line 5—5 of FIG. 4 looking in the direction of the arrow;

FIG. 6 is a view looking from the rear of the scatterer taken generally on the line 6—6 of FIG. 3 looking in the direction of the arrow;

FIG. 7 is a perspective view of a modified form of rotary scattering device having flexible blades thereon;

DESCRIPTION OF A FIRST EMBODIMENT

Figure 8:
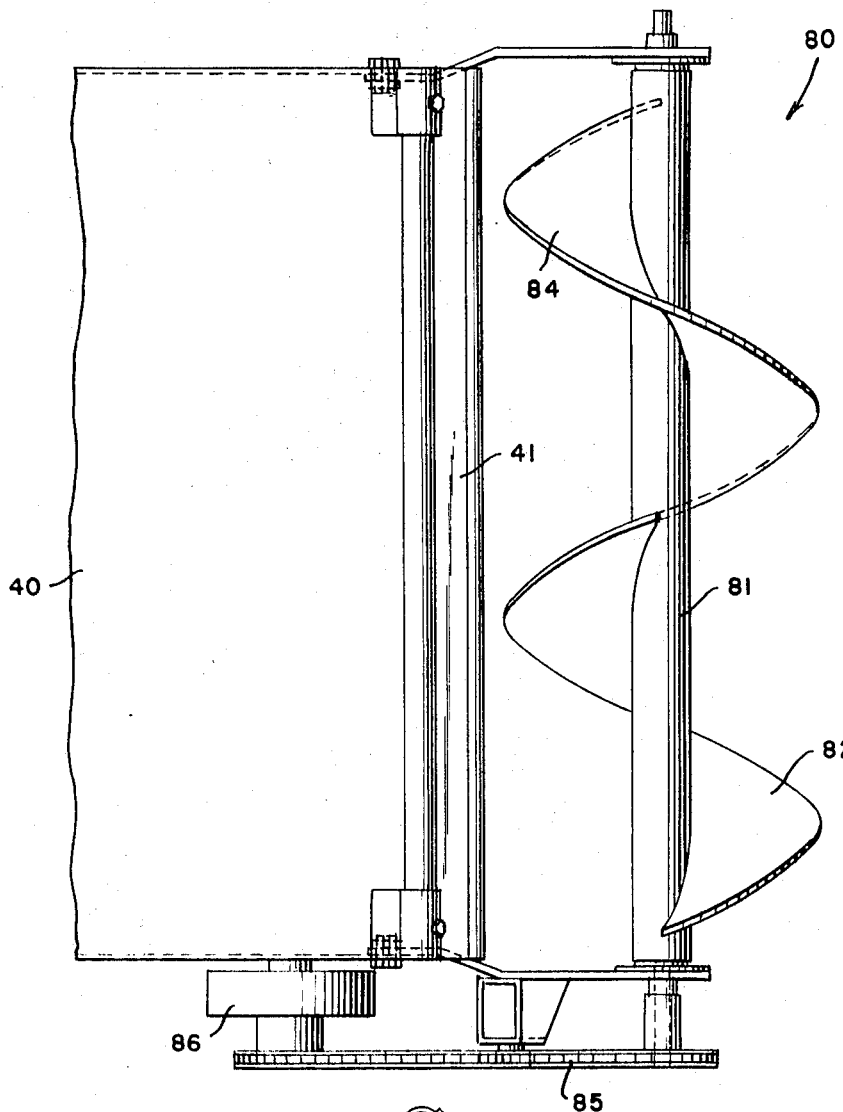
FIG. 8 is a plan view of a scatterer constructed according to another embodiment of this invention.

Referring now to the drawings by numerals of reference, and particularly to FIGS. 1–6, 10 denotes generally a harvesting machine having a frame structure 11 supported by a pair of coaxial, laterally spaced ground wheels 12 and 13. Harvester 10 is adapted to travel in a forward direction indicated by the arrow 15 in FIG. 1.

At the forward end of the machine there is a header 16 comprising a transverse sickle 18 which extends across the lower front portion of the header and is adapted to cut a width of standing crop material such as twenty or more feet wide. Header 16 has side plates 19 and 20 which support a reel 22 rotatable in a counterclockwise direction when viewed as shown in FIG. 2 and having crop engaging tines 24 which sweep the standing material over the sickle 18 and then serve to discharge the cut material upwardly and rearwardly.

After the material has been cut by the sickle 18, it is deposited on a transversely extending support 25 (FIG. 2) having a curved rearward portion 26 which defines a trough 28 in which a consolidating device in the form of an auger 29 is rotatably operative. Auger 29 comprises a tube 30 having a left hand flight section 31 and a right hand flight section 32 which convey and converge the crop material toward the longitudinal center of the machine. At the center of the auger there are deflector plates 34 which engage the material and discharge it rearwardly in a consolidated mass through opening O for travel between the two ground wheels 12 and 13.

If desired, the crop material can be deposited on the ground from auger 29 or it may be supported in its rearward travel on a floor 35, FIG. 2. In either case, the narrow mass of material is delivered to a pair of crop conditioning rolls, namely upper roll 36 and lower roll 37 rotatably journalled on side frame members 38 and 39 carried on harvester frame 11. The rolls 36 and 37 may be smooth crushing rolls or fluted crimper rolls as desired. The rolls rotate in opposite directions as indicated in FIG. 3 and they discharge the crop material passed between them in an upward rearward stream. The structure has a hood 40 against which the crop material is directed and the rearward edge of the hood has a transversely downwardly extending deflector 41 which is adjustable, for example, from the solid line position shown in FIG. 3 to the dotted line position. Deflector 41 and the hood 40 interrupts the upward travel of the hay as the hay moves rearwardly and directs the stream downwardly and rearwardly. As will be understood from FIG. 1, as the consolidated mass of hay moves rearwardly relative to the machine from the header, the wheels 12 and 13 pass on opposite sides of the stream.

Located in the path of the rearwardly travelling stream of crop material is a scattering device 50 comprising paddle devices 51 and 52, each having four radial paddles 54 rigidly connected to a support disc 55. Each rotary device has a vertical shaft 56 inclined in an upward and forward direction and rotatable on a frame 53 carried on the conditioner frame. The paddles on the devices shown in FIGS. 3, 4 and 5, are made of metal or other rigid material and they project radially of the discs 55 on which they are carried. The devices are rotated by a belt drive train 58 driven by a connection to a sheave 59 which operates the belts 60 and 61 which rotate the conditioning rolls 36 and 37. Sheave 59 is driven from a power source P (FIG. 2) on the harvester. Drive belt 58 extends around pulleys 62, 64 and 65 as illustrated best in FIGS. 3–5. A chain and sprocket drive 66 connects to two paddle devices to rotate in timed relation to each other.

The paddles or blades 54 of rotary devices 51 and 52 travel in a common inclined plane. They are positioned out of phase with each other so that as the paddles rotate, they do not engage. The direction of rotation of the devices is such that device 51 discharges material towards the right of the machine facing forwardly and device 52 discharges material toward the left of the machine. The lateral throw of the material as it engages the scatterer is in part controlled by the position of the deflector 41 and the angle at which the stream of material engages the rotating blades. The deposit of the material may be in a swath as wide as the original cut or a lesser amount. When deposited, a portion of the swath is behind the wheels 12 and 13 and in alignment therewith.

In the travel of the crop material to the ground, a pair of baffles 68 are provided each of which is pivotally connected at 69 to a fore-and-aft extending support arm 70 connected by pin and slot means 71 (FIG. 3) to the side sheets 38–39 of the conditioner. The connections 71 allow fore-and-aft adjustment of the arms 70 whereby the baffles 68 can be positioned as desired. These baffles guide the crop material to the ground and they may be swung inwardly or outwardly by means of a cable or rope 72 (FIGS. 1 and 3) to control the width of the swath of the discharged material.

With the structure described, a very wide cut of material can be achieved with the header and then consolidated for passage rearwardly between the conventionally spaced ground wheels 12 and 13. The scattering device then operates to spread the material laterally so that it will be deposited on the ground in a wide swath where it may dry more rapidly than if it were in a narrow window.

Instead of constructing the blades 54 of the paddle devices of sheet metal or the like, they may be made as shown in FIG. 7 of blades 74 of flexible material such as tire carcass. Blades 74 are shown connected to a small diameter disc 75 by simple bolt connections 76.

SECOND EMBODIMENT OF INVENTION

Figure 9:
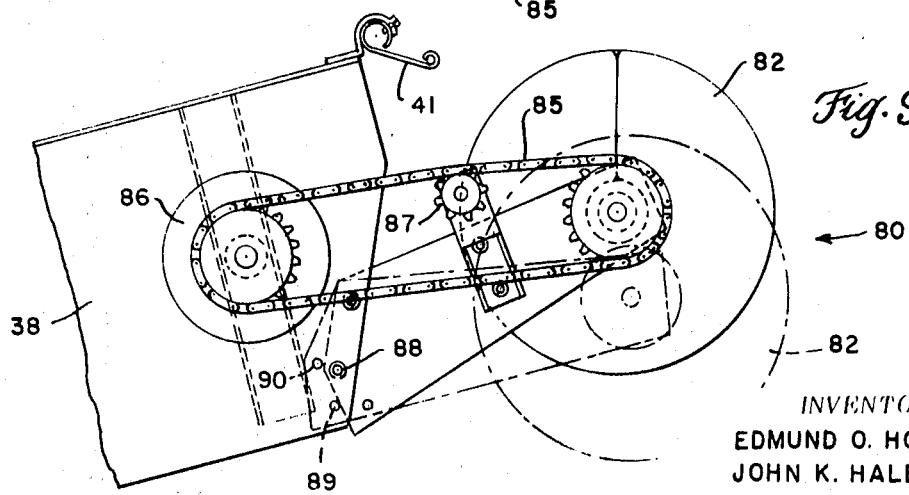
FIG. 9 is a side elevation of FIG. 8 and showing how the scatterer of FIG. 8 may be vertically adjusted.

Referring now to FIGS. 8 and 9, there is shown a scattering device 80 constructed according to a second embodiment of this invention. In this embodiment, the scattering device comprises an auger 81 having blade sections 82 and 84 which each operate to convey and deliver material laterally outwardly relative to the longitudinal axis of the machine. Device 80 is rotated by a chain 85 driven from a suitable source of power 86 connected by means not shown to the drive for the conditioner. A chain tightener 87 is shown in FIG. 9.

Device 80 is supported on the side sheets of the conditioner by bolts 88 which may be selectively connected to holes 89–90 so that the auger may be positioned in the solid line location of FIG. 9 or in the dotted location. In this way, the engagement of the material with the auger can be varied and this will have an affect upon the lateral distribution of the material onto the ground. Also, the deflector 41 can be adjusted upwardly or downwardly to vary the engagement of the stream of material into the auger blades.

With either device 50 or 80, the crop material will be spread and scattered laterally as it comes from the conditioner so that if it will be deposited on the ground in a wide swath for more rapid drying than if it were deposited in a windrow. The drying time is generally no longer than that achieved with a conventional mower and conditioner. However, because of the wide width of the header, it will cut the standing crop with less trips around the field, thereby saving the farmers time.

While this invention has been described in connected with two embodiments thereof, it will be understood that it is capable of modification, and this application is intended to cover any variations, uses, or adaptations, following, in general, the principles of the invention and including such departures from the present disclosure as come within the known or customary practice in the art to which the invention pertains, and as fall within the scope of the invention, or the limits of the appended claims.

Having thus described our invention, what we claim is:

1. A harvesting machine comprising, in combination, a mobile frame adapted to travel across a field having standing crop material, a header mounted on the front of said frame having a sickle to cut a given width of material and means to receive and laterally consolidate cut material into a mass narrower than said given width, a scatterer mounted on said frame rearwardly of said header over an open area to ground, said consolidated material being discharged from said header to said scatterer, and said scatterer having means to spread the material laterally for deposit on the ground through the open area in a swath substantially wider than said consolidated mass.

2. A harvesting machine as recited in claim 1 wherein a conditioner is mounted on said frame between said header and said scatterer, said conditioner having a pair of transverse rolls mounted one above the other to receive material from the header, pass it between the rolls, and discharge the material rearwardly to the scatterer.

3. A harvesting machine as recited in claim 2 wherein a crop engaging hood and deflector are provided to engage material discharged by said conditioner and direct material downwardly onto said scatterer.

4. A harvesting machine as recited in claim 1 wherein baffle means is carried on said frame and located in the path of material spread laterally by said scatterer to guide the material to the ground.

5. A harvesting machine as recited in claim 4 wherein means is provided for adjusting said baffle means relative to said frame and said scatterer.

6. A harvesting machine as recited in claim 5 wherein baffle means is carried on support arms and said adjusting means comprises slot and pin means between said support and said frame providing fore-and-aft adjustment of said baffle means.

7. A harvesting machine as recited in claim 4 wherein said baffle means comprise a pair of baffles pivotally connected to a pair of support arms on said frame, and means for pivoting said baffles relative to said support arms.

8. A harvesting machine as recited in claim 1 wherein said scatterer comprises a pair of counter rotating paddle devices.

9. A harvesting machine as recited in claim 8 wherein said paddle devices are supported for rotation about vertically extending axes.

10. A harvesting machine as recited in claim 9 wherein said axes are inclined forwardly relative to the ground travel of said machine.

11. A harvesting machine as recited in claim 8 wherein said paddle devices each have a plurality of blades, the blades on one device travelling in a path which overlaps the path of travel of the blades of the other device, and means for driving said paddle devices in such timed relation to each other to preclude engagement of the blades of one device with the other.

12. A harvesting machine as recited in claim 8 wherein said paddle devices have flexible crop engaging blades.

13. A harvesting machine as recited in claim 1 wherein said scatterer comprises an auger device mounted on said frame for rotation on a transverse axis.

14. A harvesting machine as recited in claim 13 wherein said auger device has left and right hand flights to deliver material laterally outwardly on opposite sides of the scatterer.

15. A harvesting machine as recited in claim 13 wherein means is provided for raising and lowering the axis of rotation of said auger device to place the scatterer in proper position to receive consolidated material from said header.

16. A harvesting machine comprising, in combination, a mobile frame supported on a pair of spaced apart ground wheels and adapted to travel across a field having standing crop material, a header transversely mounted on said frame in front of said ground wheels and having a width substantially greater than the space between said wheels, said header having a sickle to cut said crop material and a reel which sweeps the crop over the sickle, means on said header to receive and laterally consolidate cut material into a mass narrow enough to pass between said pair of wheels and to discharge the material in a location whereby the wheels will travel on opposite sides of the narrow mass, a conditioner mounted on said frame and having a pair of transversely extending rolls which receive material from the header, pass the material between the rolls and then discharge the material rearwardly, a scatterer mounted on said frame in a location to receive crop material from said conditioner and disperse it laterally for deposit on the ground in a swath wider than said narrow mass and the spacing between said wheels and with portions of the crop material engaging the ground directly behind the wheels.

17. A method of harvesting crop material comprising:
cutting a given width of standing crop material,
catching and supporting the crop material after it is cut and laterally consolidating it into a narrow mass in a given location, and
receiving said narrow mass of material in a location rearwardly of said given location and scattering the material laterally for deposit on the ground in a swath wider than said narrow mass.

18. A method of harvesting crop material comprising:
cutting a given width of standing crop material,
catching and supporting the crop material after it is cut and laterally consolidating it into a narrow mass in a given location,
conditioning said narrow mass and discharging it rearwardly to a location rearwardly of said given location, and
receiving said narrow mass of material and scattering it laterally for deposit on the ground in a swath wider than said narrow mass.

References Cited

UNITED STATES PATENTS

| | | | |
|---|---|---|---|
| 2,490,143 | 12/1949 | Magee | 56—364X |
| 3,324,639 | 6/1967 | Halls et al. | 56—23 |

ROBERT PESHOCK, Primary Examiner